United States Patent
Zhou

(10) Patent No.: US 10,390,001 B2
(45) Date of Patent: Aug. 20, 2019

(54) REAR VIEW VISION SYSTEM FOR A VEHICLE

(71) Applicant: He Li Zhou, Toronto (CA)

(72) Inventor: He Li Zhou, Toronto (CA)

(73) Assignee: He Li Zhou, Etobicoke, Ontario (CA)

( * ) Notice: Subject to any disclaimer, the term of this patent is extended or adjusted under 35 U.S.C. 154(b) by 183 days.

(21) Appl. No.: 15/634,363

(22) Filed: Jun. 27, 2017

(65) Prior Publication Data

US 2018/0376124 A1    Dec. 27, 2018

(51) Int. Cl.
*H04N 13/00* (2018.01)
*H04N 13/02* (2006.01)
(Continued)

(52) U.S. Cl.
CPC ............ *H04N 13/243* (2018.05); *B60R 1/00* (2013.01); *B60R 1/04* (2013.01); *G02B 27/0101* (2013.01); *G02B 27/0172* (2013.01); *G02B 27/14* (2013.01); *G06K 9/00832* (2013.01); *H04N 13/156* (2018.05); *H04N 13/344* (2018.05); *B60R 2300/105* (2013.01); *B60R 2300/107* (2013.01); *B60R 2300/20* (2013.01);
(Continued)

(58) Field of Classification Search
CPC .. H04N 13/243; H04N 13/156; H04N 13/344; H04N 7/18; H04N 7/181; H04N 5/44504; H04N 5/23216; B60R 1/00; B60R 1/04; B60R 2001/1253; B60R 11/04; B60R 2300/105; B60R 2300/107; B60R 2300/20; B60R 2300/303; B60R 2300/8046; B60R 2011/0033; B60R 1/02; G02B 27/0101; G02B 27/0172; G02B 27/14; G02B 2027/0138; G02B 2027/014; G06K 9/00832
USPC ....... 348/115, 118, 42, 46–52, 54, 148, 149; 340/461, 425.5, 438, 462, 815.4; 382/104
See application file for complete search history.

(56) References Cited

U.S. PATENT DOCUMENTS 3,985,424 A    10/1976    Steinacher
5,289,321 A    2/1994    Secor
(Continued)

FOREIGN PATENT DOCUMENTS

CN    103568654    2/2014
DE    69618192    8/2006
(Continued)

OTHER PUBLICATIONS

Stoklosa, A: "Hey Smart Lookin': We Sample Nissan's "Smart" Rearview Mirror Technology" dated Jun. 19, 2014, retrieved on Feb. 17, 2017 from http://blog.caranddriver.com/hey-smart-lookin-we-sample-nissans-smart-rearview-mirror-technology.
(Continued)

*Primary Examiner* — Sherrie Hsia
(74) *Attorney, Agent, or Firm* — Rowand LLP

(57) ABSTRACT

A rear-view vision system for a vehicle is provided. The system includes a reflection device mounted adjacent a front windshield surface to redirect a reflection of a rear view of the vehicle. The system includes an image capturing device having a field of view facing the reflection device to capture a rear-view image of the reflection. The system may also include a display unit in communication with the image capturing device for displaying the captured rear-view image to a vehicle operator.

19 Claims, 12 Drawing Sheets

(51) Int. Cl.
*H04N 13/04* (2006.01)
*H04N 7/18* (2006.01)
*H04N 13/243* (2018.01)
*G06K 9/00* (2006.01)
*G02B 27/14* (2006.01)
*G02B 27/01* (2006.01)
*B60R 1/00* (2006.01)
*B60R 1/04* (2006.01)
*H04N 13/156* (2018.01)
*H04N 13/344* (2018.01)
*H04N 5/445* (2011.01)

(52) U.S. Cl.
CPC . *B60R 2300/303* (2013.01); *B60R 2300/8046* (2013.01); *G02B 2027/013* (2013.01); *G02B 2027/014* (2013.01); *G02B 2027/0134* (2013.01); *G02B 2027/0138* (2013.01); *H04N 5/44504* (2013.01)

(56) References Cited

U.S. PATENT DOCUMENTS

| | | | |
|---|---|---|---|
| 5,424,952 | A | 6/1995 | Asayama |
| 5,526,195 | A | 6/1996 | Thomas |
| 5,670,935 | A | 9/1997 | Schofield et al. |
| 7,006,129 | B1 | 2/2006 | McClure |
| 7,564,479 | B2 | 7/2009 | Schedivy |
| 7,859,565 | B2 | 12/2010 | Schofield et al. |
| 8,633,810 | B2 | 1/2014 | Luo et al. |
| 8,994,825 | B2 | 3/2015 | Ramanath et al. |
| 9,061,635 | B2 | 6/2015 | Luo et al. |
| 2002/0003571 | A1* | 1/2002 | Schofield ............... B60C 23/00 348/148 |
| 2005/0232469 | A1* | 10/2005 | Schofield ........... G06K 9/00818 382/104 |
| 2011/0102583 | A1 | 5/2011 | Kinzalow |
| 2013/0128049 | A1 | 5/2013 | Schofield et al. |
| 2014/0036081 | A1 | 2/2014 | Lang et al. |
| 2014/0327775 | A1 | 11/2014 | Cho |
| 2014/0340516 | A1 | 11/2014 | Vojtisek et al. |
| 2016/0318456 | A1 | 11/2016 | Moenig et al. |

FOREIGN PATENT DOCUMENTS

| | | |
|---|---|---|
| DE | 102010008346 | 8/2011 |
| EP | 2431226 | 3/2012 |
| WO | 1996021581 | 7/1996 |
| WO | 1996038319 | 2/1997 |
| WO | 2015158416 | 10/2015 |

OTHER PUBLICATIONS

Topspeed: "2016 BMW 18 Mirrorless Concept | car review", retrieved from http://www.topspeed.com/cars/bmw/2016-bmw-i8-mirrorless-concept-ar172138.html on Feb. 17, 2017.

Cadillac: "Cadillac's 2017 CT6 Features A Rear Camera Mirror, the Industry's First Application of Full-Display Technology" retrieved from http://media.gm.com/media/me/en/cadillac/news.detail.html/content/Pages/news/me/en/2016/Cadillac/07062016-Cadillac-2017-CT6-Features-Rear-Camera-Mirror-Display-Technology.html on Feb. 17, 2017.

Beecham, M.: "Research Snapshot: Mirrorless cars" dated Feb. 17, 2016, retrieved from http://www.just-auto.com/analysis/mirrorless-cars_id167093.aspx on Jun. 21, 2017.

* cited by examiner

REAR VIEW VISION SYSTEM FOR A VEHICLE

FIELD

The present application generally relates to vehicles and, in particular, to rear-view vision systems for vehicles.

BACKGROUND

Vehicles, such as cars, trucks, and buses, commonly include side-view mirrors or a rear-view mirror to enable a vehicle operator to have visual awareness of the space around the vehicle. To increase a field of view to the vehicle operator, curved mirrors, such as convex mirrors, may be used. In some cases, externally mounted camera lenses may be used to provide a vehicle operator with visual awareness of the space around the vehicle.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application describes a rear-view vision system for a vehicle. The system includes: a reflection device mounted adjacent a front windshield surface to redirect a reflection of a rear view of the vehicle; an image capturing device having a field of view facing the reflection device to capture a rear-view image of the reflection; and a display unit in communication with the image capturing device for displaying the captured rear-view image to a vehicle operator.

In another aspect, the present application describes a method of generating a template of physical points of reference for the rear-view vision system. The method includes identifying interior objects within the vehicle based on image data from a third camera, where the third camera is positioned between a first camera and a second camera, the third camera being oriented in a common direction with the first camera and the second camera; generating a template of the interior objects within the vehicle based on image data from the third camera; and overlaying the generated template on stitched image data from the first camera and the second camera for generating a collective rear view image for display on a standard display.

In another aspect, the present application describes a non-transitory computer-readable medium storing computer-executable program instructions which, when executed, configure a processor of a rear-view vision system, including a digital signal processor, to perform one or more of the described methods. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The example embodiments described herein relate to a rear-view vision system for vehicles. It will be understood that some aspects of the present application are not limited for implementation in passenger automobiles and may be applied to other types of machines operated by an operator requiring awareness of a space in front of, to the side of, or behind the machine.

Figure 1:
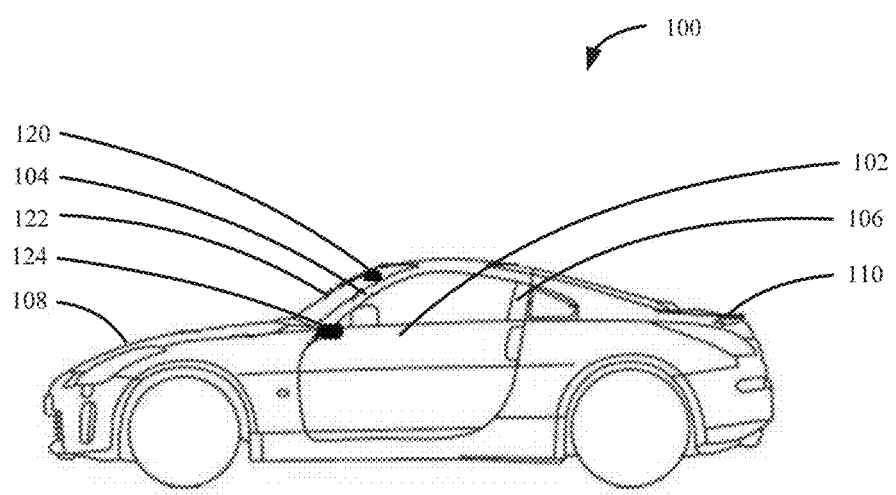
FIG. 1 illustrates a left side view of an example passenger automobile.

Reference is now made to FIG. 1, which illustrates a side view of an example passenger automobile 100. Although the passenger automobile may have two doors, such as a vehicle operator side door 102 and a passenger side door (not illustrated), the passenger automobile 100 may have any number of doors and the doors may be configured in any number of ways.

In FIG. 1, the passenger automobile 100 may also include generally vertical supports for window areas. For example, the passenger automobile 100 may include an A-pillar 104 and a B-pillar 106. In some passenger automobiles, if there are further number of doors, the vehicle may include further number of pillars. In some configurations, the A-pillar 104 or the B-pillar 106 may be a visual obstacle for the vehicle operator. Although the passenger automobile 100 is illustrated to be a two-door car, in some embodiments, the passenger automobile 100 may have any number of doors. In some embodiments, the passenger automobile 100 may be a truck or bus. Further, the passenger automobile 100 has a vehicle front portion 108 and a vehicle rear portion 110.

The passenger automobile 100 may have a driver's seat (not explicitly illustrated in FIG. 1) for a vehicle operator. For example, in North America, a driver's seat may be positioned in a front-left portion of the vehicle. In some other countries or continents, the driver's seat may be positioned in a front-right portion of the vehicle.

When a vehicle operator is seated in the driver's seat, the vehicle operator may be positioned to generally view the space in front of the vehicle. Human binocular vision (e.g., vision with two eyes) includes a visual field having at least a 180-degree forward-facing horizontal arc. Accordingly, when the vehicle operator is seated in a driver's seat, the vehicle operator may be unable to view space to side portions and to the rear of the vehicle without turning the vehicle operator's head or using a device that may be located within the vehicle operator's forward-facing horizontal arc visual field.

The passenger automobile 100 may include a rear-view mirror 120 mounted on a front windshield 122 and at least one side view mirror positioned on an exterior side portion of the automobile. For example, the passenger automobile 100 may include a left side view mirror 124 and a right side view mirror (not illustrated in FIG. 1).

The rear-view mirror 120 may be generally rectangular in shape and may be positioned to reflect a rear view of the vehicle to the vehicle operator. The rear-view mirror may be adjustable by the vehicle operator for reflecting a view of the rear space of the vehicle. For example, as the vehicle operator adjusts the driver's seat height, the vehicle operator may also adjust the rear-view mirror to see a reflection of the rear view of the vehicle.

In some embodiments, the left side view mirror 124 and the right side view mirror may also be generally rectangular in shape, and may be mounted on a vehicle side door. For example, the left side view mirror 124 may be mounted on a vehicle operator side door 102. The left side view mirror 124 and the right side view mirror may be adjustable by the vehicle operator for reflecting a side or rear view of the vehicle.

In the above described example passenger automobile 100, the side view mirrors and the rear-view mirror 120 are affixed to different positions on the vehicle. Accordingly, each of the side view mirrors and the rear-view mirror 120 provides a reflection to the vehicle operator from a different viewpoint.

The rear-view mirror 120 in the passenger automobile 100 may be limited in size and may provide a limited rear field of view to the vehicle operator. For example, the limited rear field of view may be the angle through which the vehicle operator may view a reflection of the rear view. Accordingly, the left side view mirror 124 and the right side view mirror may expand the rear field of view that may be viewable by the vehicle operator. For example, the left side view mirror and the right side view mirror may be positioned to assist the vehicle operator with viewing areas beyond the vehicle operator's peripheral vision and to the rear. Collectively, the rear-view mirror 120 and the side view mirrors may provide the vehicle operator with a larger rear field of view compared to any one of the mirrors individually. However, in some scenarios, the combination of the rear-view mirror 120 and the side view mirrors may not sufficiently provide a desirable rear field of view. For example, passenger automobile may have blind spots that include areas of the road that the vehicle operator cannot see while looking in a forward direction and/or looking through the rear-view mirror or the side view mirrors. Further, the A-pillar 104 and the B-pillar 106 may physically obstruct the vehicle operator's view. Accordingly, a vehicle operator may need to physically turn their head when the vehicle operator needs to check their blind spots.

Attempts to ameliorate challenges associated with vehicle blind spots include supplementing or replacing the rear-view mirror 120 and the side view mirrors with curved or convex mirrors. Convex mirrors may widen the field of view offered by the rear-view mirror 120 and the side view mirrors. However, objects viewed using convex mirrors may appear smaller than they otherwise would be when a non-convex mirror is used, allowing for the wider field of view. Further, images viewed using convex mirrors may be distorted. The vehicle operator may find it challenging to determine the position of objects or detect relative movement of objects using convex mirrors as objects may seem farther away from the convex mirror than they actually are. Because the vehicle operator's ability to detect changing proportions of object size over time (e.g., objects relative to the passenger automobile when the passenger automobile is moving) when using convex mirrors may be inhibited, the vehicle operator may maneuver (e.g., change lanes) based on an incorrect perception that another automobile may be further away than perceived. Accordingly, convex mirrors may not be suitable for widening a rear field of view in passenger vehicles.

As described, the combination of the rear-view mirror 120 and the side view mirrors may collectively provide the vehicle operator with a larger rear field of view compared to any one of the mirrors individually. However, the vehicle operator may need to continuously pan their head or eyes from the left side view mirror 124 to the rear-view mirror 120 to the right side view mirror, and back again, to benefit from the larger rear field of view provided by the combination of mirrors. Each time the vehicle operator looks to a mirror, the vehicle operator may need to mentally establish a new focus on objects reflected in that respective mirror. Accordingly, the vehicle operator may need to continually monitor each of the mirrors and mentally combine the perceived images from the respective mirrors for forming an overall picture of the larger rear field of view provided by the combination of mirrors.

Attempts to ameliorate challenges and inconvenience of mentally combining perceived images from side view mirrors and a rear view mirror include replacing each of the left side view mirror 124, the rear-view mirror 120, and the right side view mirror with a camera lens for capturing images from each of the respective viewpoints.

Figure 2:
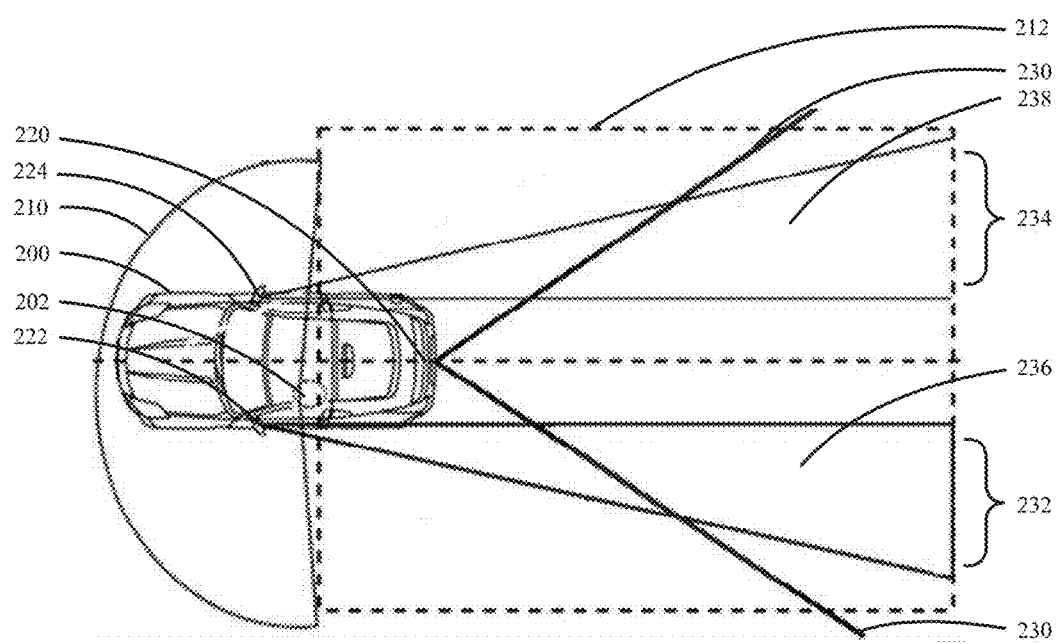
FIG. 2 illustrates a top view of a vehicle and multiple fields of view associated with respective camera lenses.

To illustrate, reference is now made to FIG. 2, which is a top view of a vehicle 200 and multiple fields of view associated with respective camera lenses. The vehicle 200 may include a driver's seat for positioning a vehicle operator 202. The vehicle operator 202 may have a visual field 210 having at least a 180-degree forward-facing horizontal arc.

The vehicle operator 202 may desire awareness of a rear area of interest 212. The rear area of interest 212 may include portions of the space to the side and rear of the vehicle operator 202. For example, when the vehicle operator 202 may need to change traffic lanes (e.g., to a traffic lane to the left or to a traffic lane to the right), the vehicle operator 202 may want to ensure that there are no vehicles within the rear area of interest 212 or that vehicles approaching in the target traffic lane will not be quickly entering the rear area of interest 212. That is, the vehicle operator 202 may want to ensure that the space generally circumscribed by the rear area of interest 212 may be free of other vehicles such that the vehicle operator 202 may safely maneuver into a portion of the rear area of interest 212.

As suggested in the foregoing description, attempts to ameliorate some of the challenges and inconvenience of mentally combining perceived images from the side view mirrors and the rear-view mirror 120 include replacing each of the left side view mirror 124, the rear-view mirror 120, and the right side view mirror with a camera lens. For example, the vehicle 200 may include a central rear view camera lens 220 positioned near a rear bumper of the vehicle 200, a left rear view camera lens 222 positioned near a left A-pillar of the vehicle 200, and a right rear view camera lens 224 positioned near a right A-pillar of the vehicle 200. In doing so, the vehicle 200 may also include an image processing system for serially displaying or for stitching together images from each respective camera lens.

For example, the central rear view camera lens 220 may provide a central field of view 230. That is, a field of view may be represented by or associated with an angle through which a camera image sensor may be sensitive to electronic radiation for capturing image data. The field of view may be the visual field of the camera lens. The left rear view camera lens 222 may provide a left field of view 232. The right rear view camera lens 224 may provide a right field of view 234. The respective fields of view may overlap. For example, the left field of view 232 and the central field of view 230 may overlap and images from both respective camera lenses may include an overlapping left-central region 236 field of view. Similarly, the right field of view 234 and the central field of view 230 may overlap and images from both respective camera lenses may include an overlapping right-central region 238 field of view. Accordingly, the example rear-view system illustrated in FIG. 2 may capture images having overlapping image details. In generating a composite image, the vehicle image processing system may process the captured images and reduce redundant or overlapping image data. The vehicle image processing system may also need to merge or stitch images from each of the respective camera lenses into a single composite image. However, such stitching together of images captured from disparately located viewpoints may result in image distortion.

To reduce or minimize distortion in a composite image that is merged or stitched together using images captured from a plurality of camera lenses, the plurality of camera lenses may be positioned to provide images from a substantially similar viewpoint. As an illustrative example, three camera lenses may capture images from a similar viewpoint if each of the three camera lenses are positioned in close proximity with another camera lens, and each of the three camera lenses are oriented in a common direction. When images captured from the respective camera lenses having a substantially similar view point, a resulting composite image may illustrate objects that appear to have similar relative proportions. In contrast, when images captured from two or more camera lenses have disparately different viewpoints, the resulting composite image may be distorted or may depict objects having grossly incorrect relative proportions.

For example, the rear-view system illustrated in FIG. 2 includes camera lenses positioned at vastly different locations of the vehicle 200. In particular, the central rear view camera lens 220 may be positioned adjacent a rear bumper of the vehicle 200. The left rear view camera lens 222 may be positioned near the left A-pillar of the vehicle 200. The right rear view camera lens 224 may be positioned near the right A-pillar of the vehicle 200. Based on the physical positioning of the respective camera lenses, each of the camera lenses are positioned to have vastly different viewpoints of the rear of the vehicle 200. Because each of the camera lenses may have vastly different viewpoints of the rear, any composite image generated by the example vehicle image processing system of FIG. 2 may include distortions or out-of-proportion objects.

In FIG. 2, the vehicle image processing system may provide the vehicle operator 202 with a composite image depicting objects within the field of view of each of the respective camera lenses. However, the generated composite image may not be adept for assisting the vehicle operator 202 for determining relative size of objects depicted in the composite image and for tracking changes over time of objects within the composite field of view. To address some of the challenges relating to providing a rear view using multiple camera lenses having disparate viewpoints, it may be advantageous to limit camera placement to a common position for generating a rear view of a vehicle with a desired field of view.

To broaden a field of view of respective camera lenses, in some examples of the rear-view system described with reference to FIG. 2, wide camera lenses may be used. For example, each of the central rear view camera lens 220, the left rear view camera lens 222, and the right rear view camera lens 224 may be a wide angle lens. However, some wide angle lenses may exhibit optical distortion. For example, if the field of view of a wide angle lens may be much wider than the size of an image sensor, captured images may exhibit undesirable distortion. Because a vehicle operator may infer or adjudge distance between objects based on relative size of objects in an image or the rate of change in size of objects in an image, vehicle operators may incorrectly adjudge relative changes of object positions based on distorted images. Accordingly, for camera-based rear-view systems, it may be advantageous to utilize camera lenses for capturing images with minimal optical distortion. In some embodiments of the present application, the camera lens may include a rectilinear lens. In some embodiments of the present application, the camera lens may include a standard lens. For example, the standard lens may have a field of view of approximately 60 degrees.

Figure 3:
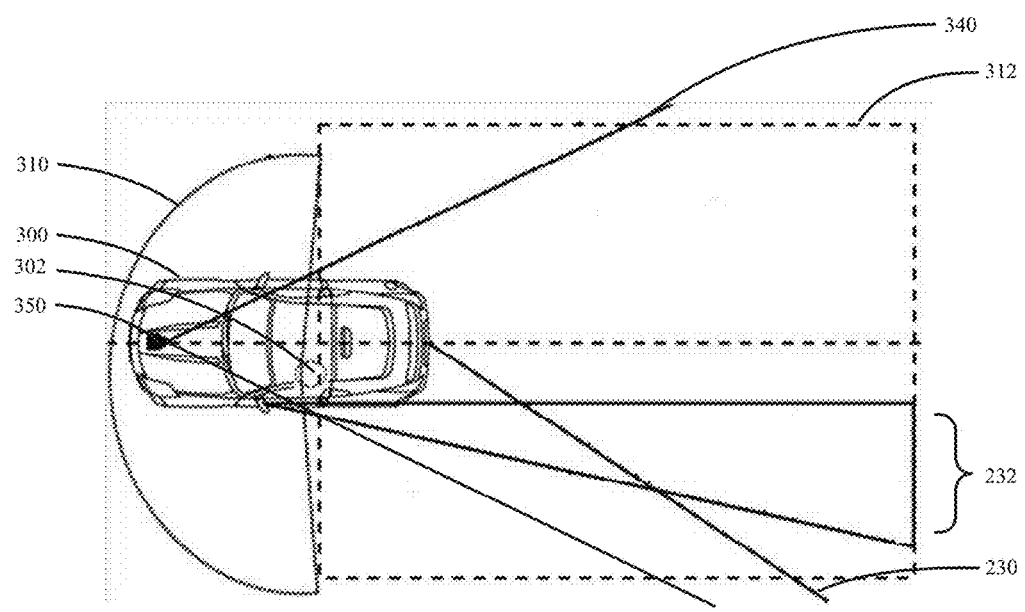
FIG. 3 illustrates a top view of a vehicle having a rear-view vision system, in accordance with an embodiment of the present application.

Reference is now made to FIG. 3, which is a top view of a vehicle 300 for illustrating principles of a rear-view vision system, in accordance with an embodiment of the present application. The vehicle 300 may include a driver's seat for positioning a vehicle operator 302. The vehicle operator 302 may have a visual field 310 having at least a 180-degree forward-facing horizontal arc.

The vehicle operator 302 may desire awareness of a rear area of interest 312. The rear area of interest 312 may include portions of the space to the side and rear of the vehicle operator 302. For example, when the vehicle operator 302 may need to change traffic lanes (e.g., to a traffic lane to the left or to a traffic lane to the right), the vehicle operator 302 may want to ensure that there are no vehicles within the rear area of interest 312 or that vehicles approaching the target traffic lane will not be quickly entering the rear area of interest 312. That is, the vehicle operator 302 may want to ensure that the space generally circumscribed by the rear area of interest 312 may be free of other vehicles such that the vehicle operator 302 may safely maneuver into a portion of the rear area of interest 312.

To address some of the challenges relating to distortion and out-of-proportion objects when merging images captured from disparately positioned viewpoints, FIG. 3 illustrates a broad field of view 340 captured with an image capturing device 350 positioned at a central position. In some embodiments, the central position may be near a front region of the vehicle. The broad field of view 340 may overlap with a relatively large portion of the rear area of interest 312. In some embodiments, the broad field of view 340 may be configured to capture a larger portion of the rear area of interest 312 than the combined fields of view of the combination of camera lenses described with reference to FIG. 2 (e.g., the combination of the central rear view camera lens 220, left rear view camera lens 222, and right rear view camera lens 224).

For ease of exposition and for comparison, FIG. 3 also illustrates a left field of view 232 associated with a left rear view camera lens positioned near a left A-pillar and a portion of a central field of view 230 associated with a central rear view camera lens from FIG. 2. As illustrated, the broad field of view 340 (provided by the image capturing device 350 at the central position adjacent the front vehicle hood) may be larger than a combined field of view (e.g., left field of view 232 and central field of view 230) of the left rear view camera lens 222 and the central rear view camera lens 220 from FIG. 2.

In some embodiments, the image capturing device 350 may include two or more camera lenses oriented in a common direction. Even though the image capturing device 350 may include multiple camera lenses, the two or more camera lenses may be configured to capture images from substantially the same viewpoint. Accordingly, in some embodiments, images captured from the two or more camera lenses may be stitched together or merged without the distortion or irregular proportions described with reference to the rear view system of FIG. 2.

In some embodiments, the image capturing device 350 may be positioned at the central position adjacent a front hood of the vehicle 300. The image capturing device 350 may be affixed to the front hood of the vehicle 300 or may be suspended above the front hood of the vehicle 300. While positioning the image capturing device 350 adjacent the front hood of the vehicle 300 may be feasible for some vehicles, in some scenarios, positioning the image capturing device 350 at the central position adjacent the front hood of the vehicle 300 may affect other vehicle design considerations. For example, if the image capturing device 350 were positioned on the front hood or suspended above the front hood, the overall aerodynamic profile for the vehicle 300 may change. If the image capturing device 350 were positioned on the front hood or suspended above the front hood, the overall aesthetics of the vehicle 300 may be altered. Further, if the image capturing device 350 were positioned on the front hood or suspended above the front hood, the image capturing device 350 may physically impede the front-facing visual field of the vehicle operator. Accordingly, as will be described in the description that follows, in some embodiments, a rear-view vision system may include an image capturing device positioned to capture images based on reflections from one or more reflective portions, such that the image capturing device appears to be capturing the images from a virtual position that is adjacent the front hood of the vehicle.

Figure 4:
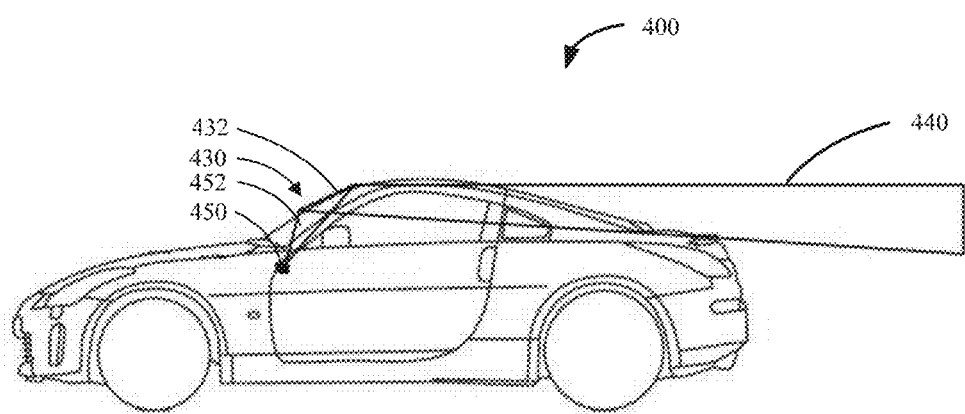
FIG. 4 illustrates a left side view of a vehicle having an image capturing device facing a reflection device mounted adjacent a front windshield, in accordance with an embodiment of the present application.

Reference is now made to FIG. 4, which illustrates a left side view of a vehicle 400 having an image capturing device 450 facing a reflection device 432 that may be mounted adjacent a front windshield 430, in accordance with an embodiment of the present application.

In particular, a rear-view vision system for the vehicle 400 includes a reflection device 432 mounted adjacent a front windshield surface to redirect a reflection of a rear view of the vehicle 400. The rear-view vision system includes an image capturing device 450 having a field of view 452 facing the reflection device 432 to capture a rear-view image of the reflection. The rear-view vision system includes a display unit (not illustrated in FIG. 4) in communication with the image capturing device 450 for displaying the captured rear-view image to a vehicle operator.

The reflection device 432 may be configured to provide a broad field of view 440. The broad field of view 440 may include a substantially large portion of a rear area of interest, where the rear area of interest may include portions of the space to the side and rear of the vehicle operator. In some embodiments, the reflection device 432 may include a transparent panel providing partially reflective surface and may be configured to reflect a portion of incident light rays and to transmit a portion of the incident light rays. For example, the transparent panel may be constructed of glass and may be configured to reflect a portion of incident light rays and to transmit a portion of incident light rays. In some embodiments, the incident light rays may represent the rear view of the vehicle. The reflection device 432 may be configured to reflect some or all of incident rays to the image capturing device 450. Accordingly, the image capturing device 450 may capture and generate images of the space to the side and rear of the vehicle 400. The generated images may be displayed by a display unit in communication with the image capturing device 450 for displaying the captured rear-view images to a vehicle operator. Although the reflection device 432 illustrated in FIG. 4 is described as a partially reflective interior surface of the front windshield 430, in some embodiments, the reflection device 432 can be any other device for reflecting a rear view of the vehicle to the image capturing device 450 for generating a rear-view image of the broad field of view 440.

Figure 5:
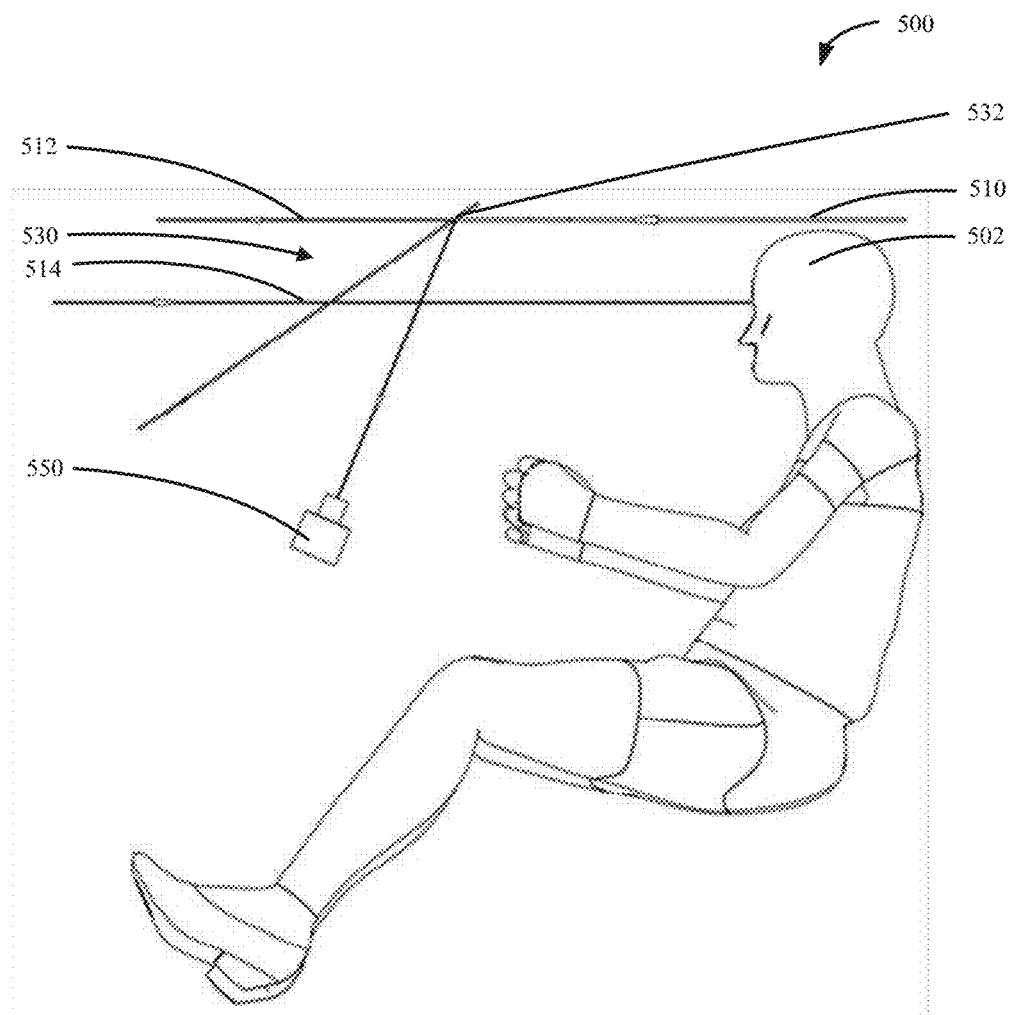
FIG. 5 illustrates a cutaway side view of a vehicle, in accordance with an embodiment of the present application.

Reference is now made to FIG. 5, which illustrates a cut-away side view of a vehicle 500, in accordance with an embodiment of the present application. For example, FIG. 5 may be an example of a vehicle interior of the vehicle 400 of FIG. 4. FIG. 5 also illustrates example light rays entering and exiting the vehicle 500.

In particular, FIG. 5 illustrates a vehicle operator 502 positioned in a driver's seat (not illustrated) of the vehicle 500. The vehicle operator 502 is positioned to face a front portion of the vehicle 500. The vehicle 500 may include a front windshield (not explicitly illustrated in FIG. 5) and a reflection device 530. The reflection device 530 may be configured to include a partially reflective interior surface 532 to reflect rear light rays 510 to an image capturing device 550. The rear light rays 510 may travel into the vehicle interior through a rear windshield (not illustrated).

Light rays incident on the front windshield may be transmitted through the reflection device 530. For example, a portion of the rear light rays 510, such as transmitted light rays 512, may exit the vehicle 500 through the front windshield. Further, front light rays 514 may enter the vehicle interior through the front windshield. Accordingly, the vehicle operator 502 may be positioned to view the front space of the vehicle 500.

In some embodiments, the reflection device 530 extends between a left windshield side and a right windshield side. The reflection device 530 may be positioned substantially parallel to a front windshield surface. In some embodiments, the reflection device 530 is positioned nearer to a vehicle roof than the image capturing device 550 (as illustrated in FIG. 5). In some other embodiments, the image capturing device may be positioned nearer to a vehicle roof than the image capturing device.

Overall, a rear-view vision system illustrated in FIG. 5 is configured to capture reflections of a vehicle rear view using an image capturing device 550. The image capturing device 550 may be positioned on a dashboard (not illustrated) or adjacent an area below the dashboard. As configured in FIG. 5, the image capturing device 550 may not impede a front visual field of the vehicle operator 502. Further, the captured reflections of the vehicle rear view may be displayed on a display unit (not illustrated). The display unit may be in communication with the image capturing device 550 for displaying captured rear-view images to the vehicle operator 502. In some embodiments, the display unit may be implemented to replace traditional rear-view and side view mirrors. For example, the display unit may be mounted adjacent the front windshield. In other examples, the display unit may be mounted on the dashboard to be viewable by the vehicle operator 502.

As will be described with reference to FIG. 6, when the image capturing device 550 is positioned on the dashboard of the vehicle (or adjacent an area below the dashboard), light rays are redirected by the reflection device 530 and, subsequently, are captured by the image capturing device 550. The light rays may appear to be captured by an image capturing device positioned as if it were at a virtual position adjacent a front hood of the vehicle.

Figure 6:
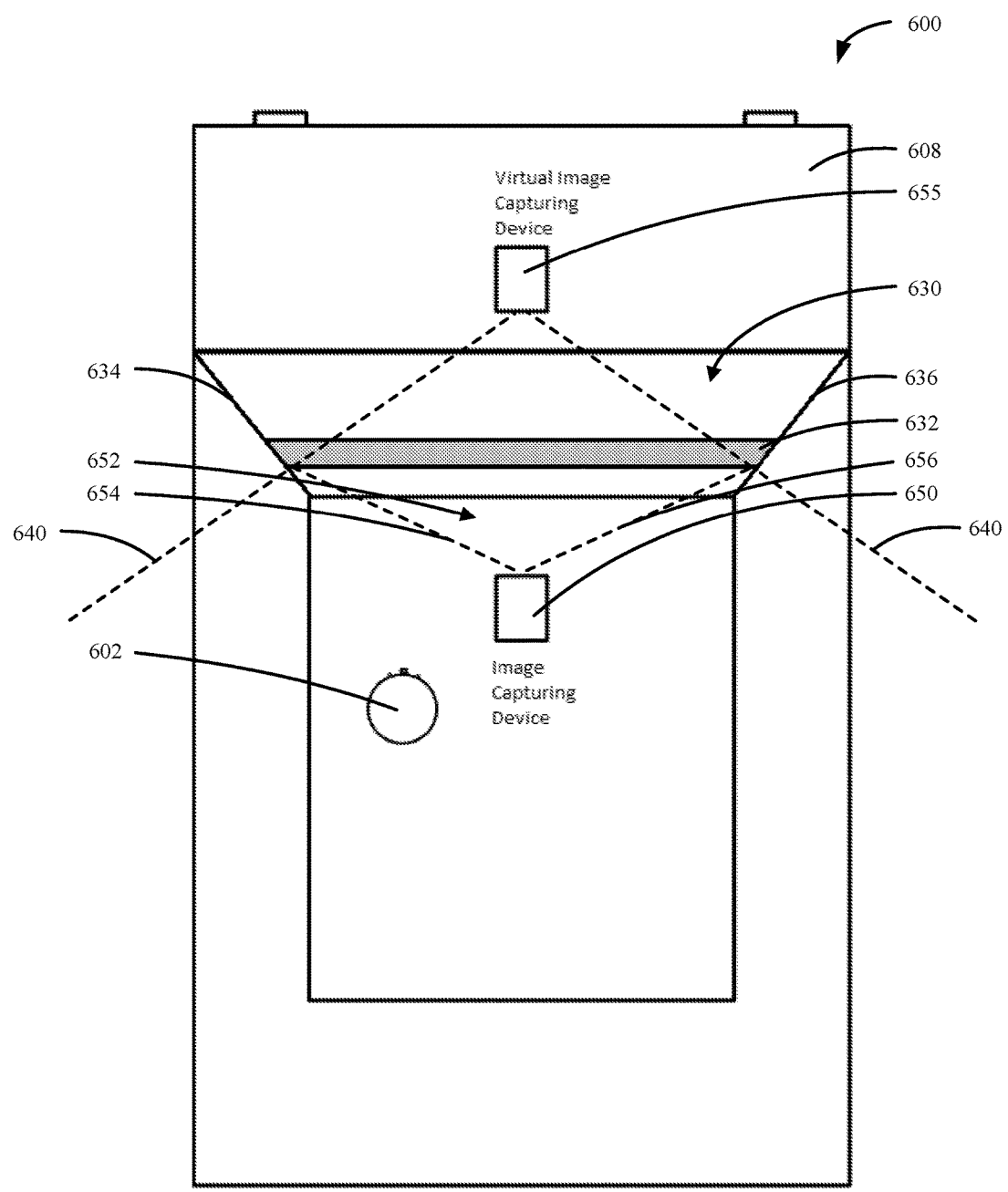
FIG. 6 illustrates a cutaway top view of a vehicle 600 including a rear-view vision system, in accordance with an embodiment of the present application.

Reference is now made to FIG. 6, which illustrates a cutaway top view of a vehicle 600 including a rear-view vision system, in accordance with an embodiment of the present application. The vehicle 600 may include a driver's seat (not illustrated) for positioning a vehicle operator 602 in a forward-facing direction. The vehicle 600 may include a front hood 608 and a front windshield 630.

In some embodiments, the rear-view vision system may include a reflection device 632 adjacent to or integrated into the front windshield 630. In FIG. 6, the reflection device 632 is illustrated to occupy a fraction of the complete surface area of the front windshield 630. However, in some embodiments, the reflection device 632 may be configured to be adjacent to or integrated into the front windshield 630 and may occupy a substantial surface area of the front windshield 630. In some embodiments, the reflection device 632 may span the entire surface area of the front windshield 630. In some embodiments, the reflection device 632 may extend between a left windshield side 634 and a right windshield side 636. In some other embodiments, may not extend an entire length between the left windshield side 634 and the right windshield side 636.

The rear-view vision system may include an image capturing device 650. The image capturing device 650 may have a capture field of view 652 facing the reflection device 632. The capture field of view 652 may include a horizontal field of view. The horizontal field of view, for example, may be generally circumscribed by illustrated dashed lines 654, 656 in FIG. 6. In some embodiments, the horizontal field of view may align with a reflection width of the reflection device 632. The reflection width may be the width of the reflection device 632 extending between the left windshield side 634 and the right windshield side 636. As configured in FIG. 6, the image capturing device 650 may capture rear-view images based on the capture field of view 652 facing the reflection device 632. In some other embodiments, the image capturing device 650 may be configured with a horizontal field of view having a shorter width than the reflective width of the reflection device 632. That is, the image capturing device 650 may be configurable by the vehicle operator 602 for determining a desired breadth of the broad field of view 640. For example, the position of the image capturing device 650 relative to the reflection device 632 may be adjusted or altered.

In some embodiments, the image capturing device 650 may generate the rear-view images based, in part, on detected reflections from the reflection device 632. It will be appreciated that a light ray incident upon a plane reflective surface may be reflected from the plane reflective surface. An angle of incidence upon the plane reflective surface with respect to a normal to the surface may equal an angle of reflection from the plane reflective surface. Because the generated rear-view images are based on reflections from the reflection device 632, the generated rear-view images may appear to be captured by a virtual image capturing device 655. As illustrated in FIG. 6, the virtual image capturing device 655 may be positioned at a virtual position adjacent a front hood 608 of the vehicle 600.

In some embodiments, the image capturing device 650 may be positioned on a dashboard at a position that is substantially midway between a left side and a right side of the vehicle. When the image capturing device 650 is positioned at a midpoint between the left side and the right side of the vehicle, the resulting broad field of view 640 of the vehicle's rear area of interest may be centered along a center axis that may divide the vehicle into the left side and the right side. In some embodiments, the image capturing device 650 may be positioned within a recessed area of the dashboard, below the surface of the dashboard.

In some other embodiments, the image capturing device 650 may be positioned adjacent a center console of the vehicle. For example, the center console may be located between the driver's seat and the passenger seat, and the image capturing device 650 may be positioned on the center console and oriented such that the field of view of the image capturing device faces the reflection device 632 to capture rear-view images of reflections. In some other embodiments, the image capturing device 650 may not be positioned at the midpoint between the left side of the vehicle and the right side of the vehicle. The image capturing device 650 may be configurable by the vehicle operator 602 for setting up a desired broad field of view 640 of the vehicle's rear area of interest.

Overall, embodiments of the present application may allow the image capturing device 650 to be configured, by the vehicle operator 602, to be nearer or farther away from the reflective device 632 for obtaining the desired broad field of view 640. That is, the image capturing device 650 may be mounted on an adjustable platform, and the adjustable platform may allow a wide arrange of motion for adjusting the scope of a capture field of view 652 relative to the reflection device 632. For example, the image capturing device may be mounted on the adjustable platform for adjusting alignment of the field of view of the image capturing device to the reflection device.

That is, embodiments of the present application may allow the image capturing device 650 to be configured according to a desired placement of the capture field of view 652. Accordingly, positional adjustments to the image capturing device 650 that may alter placement of the capture field of view 652 may result in a corresponding change in positioning of the virtual image capturing device 655.

Figure 7A:
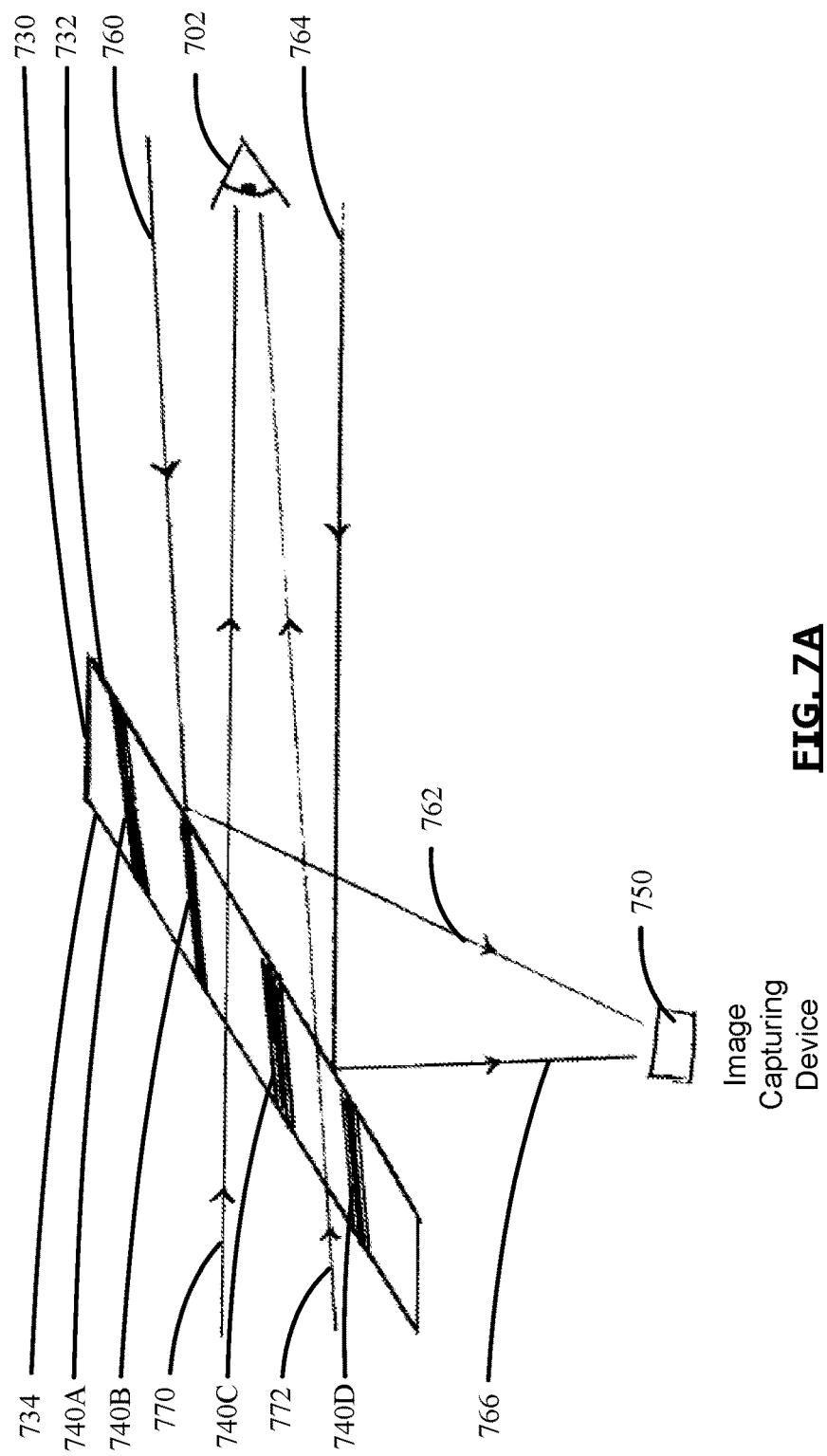
FIGS. 7A and 7B illustrate cutaway side views of a vehicle having a rear-view vision system, in accordance with an embodiment of the present application.

Reference is now made to FIG. 7A, which illustrates a cutaway side view of a vehicle for illustrating features of a rear-view vision system, in accordance with an embodiment of the present application. FIG. 7A illustrates a reflection device 730 and a vehicle operator 702. The vehicle operator 702 is illustrated as an eye of the vehicle operator.

The vehicle operator 702 may be positioned in a driver's seat and may generally be facing the reflection device 730. The reflection device 730 may be mounted adjacent a front windshield surface (not illustrated in FIG. 7A).

The reflection device 730 may include a reflection surface 732 and a second surface 734 opposite the reflection surface 732. When the reflection device 730 is mounted adjacent a front windshield surface, the reflection surface 732 may be nearer to a vehicle rear than the second surface 734. Similarly, the second surface 734 may be nearer to the vehicle front than the reflection surface 732. In some embodiments, the reflection device 730 may include an array of louver slats adjacent the reflection surface 732. As illustrated in FIG. 7A, the array of louver slats may include a first louver slat 740A, a second louver slat 740B, a third louver slat 740C, and a fourth louver slat 740D. In some embodiments, the reflection device includes a transparent panel providing the reflection surface 732, and the array of louver slats may be encapsulated within the transparent panel adjacent the reflection surface 732.

In some embodiments, the distance between adjacent louver slats in the array of louver slats is a common distance. For example, a distance (as illustrated in FIG. 7A) between the first louver slat 740A and the second louver slat 740B may be approximately the same as a distance between the second louver slat 740B and the third louver slat 740C. Further, a distance between the second louver slat 740B and the third louver slat 740C may be approximately the same as a distance between the third louver slat 740C and the fourth louver slat 740D. The distance between adjacent louver slats, as illustrated in FIG. 7A, may be a common distance. Note that FIG. 7A is not drawn to scale.

Accordingly, a louver slat in the array of louver slats may be spaced from an adjacent louver slat by the common distance such that the array of louver slats provides a continuous background to the reflection surface 732 when viewed from a point of view at the image capturing device 750. That is, when the image capturing device 750 has a field of view facing the reflection surface 732, the array of louver slats may collectively provide a continuous background to the reflection surface 732. The image capturing device 750 may perceive the array of louver slats as a background behind the reflection surface 732. In such a configuration, the image capturing device 750 may capture reflections from the reflection surface 732, and the array of louver slats may collectively block light rays from transmitting through the second surface 734, the reflection surface 732, and into the field of view of the image capturing device 750. In some scenarios, the array of louver slats may collectively provide a continuous background to the reflection surface 732 such that the image capturing device 750 may capture the reflection of the rear view with greater contrast. In some embodiments, each louver slat in the array of louver slats may be opaque or absorptive of light.

For ease of exposition, the vehicle rear view may be simplified and illustrated as a first light ray 760 and a second light ray 764. The first light ray 760 and the second light ray 764 may travel into the vehicle through a rear windshield (not illustrated) and may be incident on the reflection surface 732. The reflection surface 732 may redirect the first light ray 760 and the second light ray 764 as a redirected first incident light ray 762 and a redirected second incident light ray 766, respectively, into the image capturing device 750. Accordingly, the reflection device 730 may be oriented, in relation to the image capturing device 750, to redirect reflections of the rear view of the vehicle to the image capturing device 750. The example described with reference to FIG. 7A is provided to illustrate the principle of re-directing light rays from a rear view to the image capturing device 750 utilizing features of embodiments of the rear-view vision system of the present application. The relationship between incident light rays and reflected light rays may not be drawn to scale. Further, for ease of exposition, the example described with reference to FIG. 7A depicts a simplified representation of light rays. It will be appreciated that a light ray incident upon a plane reflective surface may reflect the light ray, where an angle of incidence upon the plane reflective surface with respect to a normal to the surface may equal an angle of reflection from the plane reflective surface.

To further illustrate the feature of the array of louver slats providing a continuous background to the reflection surface 732 when viewed from the point of view at the image capturing device 750, we may contrast with an example where the second louver slat 740B and the third louver slat 740C may not present. For example, if the second louver slat 740B and the third louver slat 740C are not present in the reflection device 730 of FIG. 7A and if the first louver slat 740A and the fourth louver slat 740D are positioned as illustrated in FIG. 7A, the first louver slat 740A and the fourth louver slat 740D may not provide a continuous background to the reflection surface 732 when viewed from a point of view of the image capturing device 750. That is, when viewed from the point of view of the image capturing device 750, the image capturing device 750 may capture light rays transmitting through the reflection device 730 from the second surface 734 through to the reflection surface 732.

The above description of FIG. 7A is focused on the array of louver slats providing a continuous background to the reflection surface 732 when viewed from the point of view at the image capturing device 750. However, when the reflection surface 732 may be viewed from the point of view of the vehicle operator 702, the array of louver slats may not provide a continuous background to the reflection surface 732. When viewed from the point of view of the vehicle operator 702, the array of louver slats may allow transmission of a third incident light ray 770 and a fourth incident light ray 772 to the vehicle operator 702. For example, when viewed from the point of view of the vehicle operator 702, the third incident light ray 770 and the fourth incident light ray 772 may be transmitted between spaces of adjacent louver slats and the vehicle operator 702 may view a front view of the vehicle. Accordingly, each louver slat in the array of louver slats includes a top planar portion substantially facing up and a bottom planar portion substantially facing down, where the array of louver slats are angled such that the front view of the vehicle is viewable by the vehicle operator 702 through spaces between adjacent louver slats in the array of louver slats. In some embodiments, each louver slat in the array of louver slats may be parallel to adjacent louver slats in the array of louver slats.

In some other embodiments, each louver slat in the array of louver slats may include a top planar portion that may not be substantially facing up and a bottom planar portion that may not be substantially facing down. Rather, each louver slat in the array of louver slats may be angled relative to the vehicle roof, for example, in other configurations such that the array of louver slats may also provide: (1) a continuous background to a reflection surface of the reflection device when viewed from the point of view of the image capturing device; and (2) spaces between adjacent louver slats when viewed from the point of view of the vehicle operator 702 such that the vehicle operator 702 may view a front view of the vehicle. Although a limited number of louver slats are illustrated in the drawings of the embodiments of the present application, in some embodiments, the array of louver slats may include any number of louver slats adjacent and extending across the reflection surface of the reflection device.

Figure 7B:
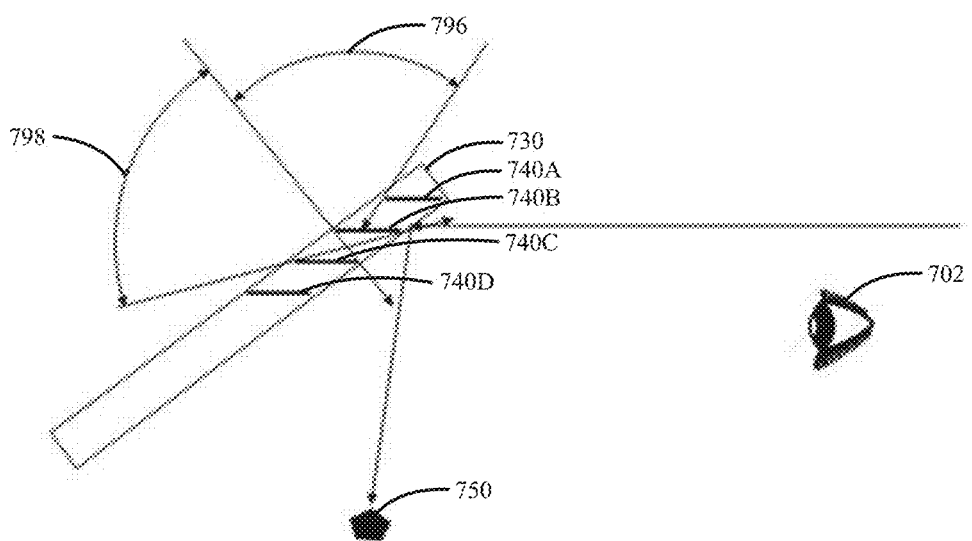

Reference is now made to FIG. 7B, which illustrates a cutaway side view of a vehicle for further illustrating features of the rear-view vision system, in accordance with an embodiment of the present application. In FIG. 7B, similar components that are illustrated in FIG. 7A are identified with similar reference numerals.

As described above, the reflection device 730 may include a transparent panel, such as glass, and an array of louver slats encapsulated within the transparent panel. The reflection device 730 may be mounted adjacent a front windshield surface to redirect a reflection of a rear view of the vehicle. The reflection device 730 may transmit some light rays incident upon the reflection device 730 and may also reflect some light rays incident upon a reflection surface of the reflection device 730. As discussed with reference to FIG. 7A, depending on a viewer's point of view, light rays may be: (1) transmitted through the reflection device 730; and/or (2) blocked from transmission through the reflection device 730 by the array of louver slats. For example, when viewed from the point of view of the vehicle operator 702, light rays may be transmitted through the reflection device 730 between adjacent louver slats. Taking the space between the second louver slat 740B and the third louver slat 740C in FIG. 7B as an example, from the point of view of the vehicle operator 702, light rays incident on the reflection device 730 within the illustrated transmission region 798 may be transmitted through the space between the second louver slat 740B and the third louver slat 740C to the vehicle operator.

When viewed from the point of view of the image capturing device 750, light rays incident upon the reflection device 730 within the illustrated blocking region 796 may not be transmitted through any space between slats in the array of louver slats. That is, when viewed from the point of view of the image capturing device 750, the array of louver slats provides a continuous background to the reflection surface of the reflection device 730. Accordingly, the image capturing device 750 captures reflections from the reflection surface 732, whilst the array of louver slats provide a continuous background to the reflection surface 732.

Figure 7C:
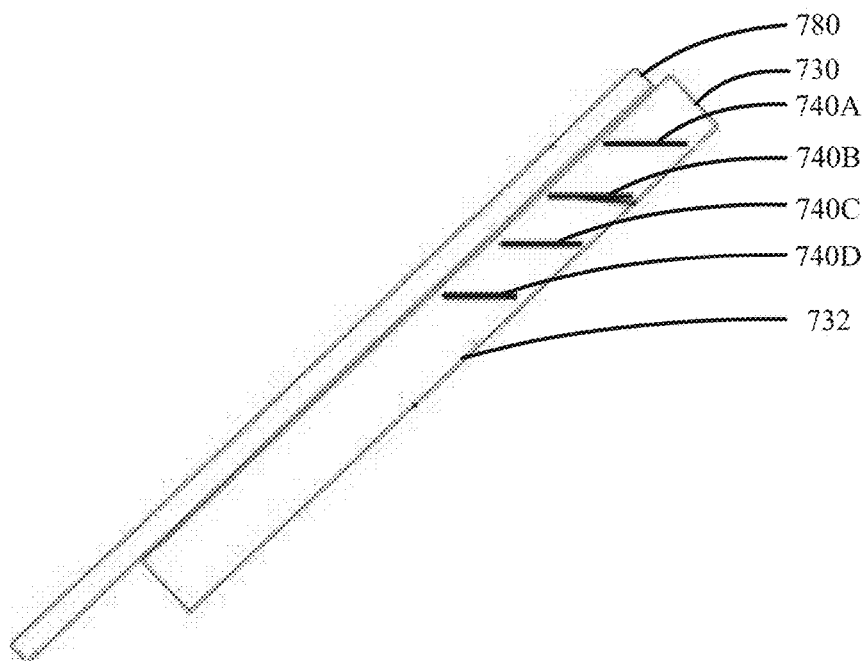
FIGS. 7C and 7D illustrate side views of reflection devices mounted adjacent a front windshield, in accordance with embodiments of the present application.

Reference is now made to FIG. 7C, which illustrates a side view of the reflection device 730 mounted adjacent a front windshield 780, in accordance with an embodiment of the present application. As illustrated in FIG. 7C, the reflection device 730 may be mounted on a vehicle interior facing surface of the front windshield 780. Further, in some embodiments, the reflection device may be positioned substantially parallel to the vehicle interior facing surface of the front windshield 780.

Figure 7D:
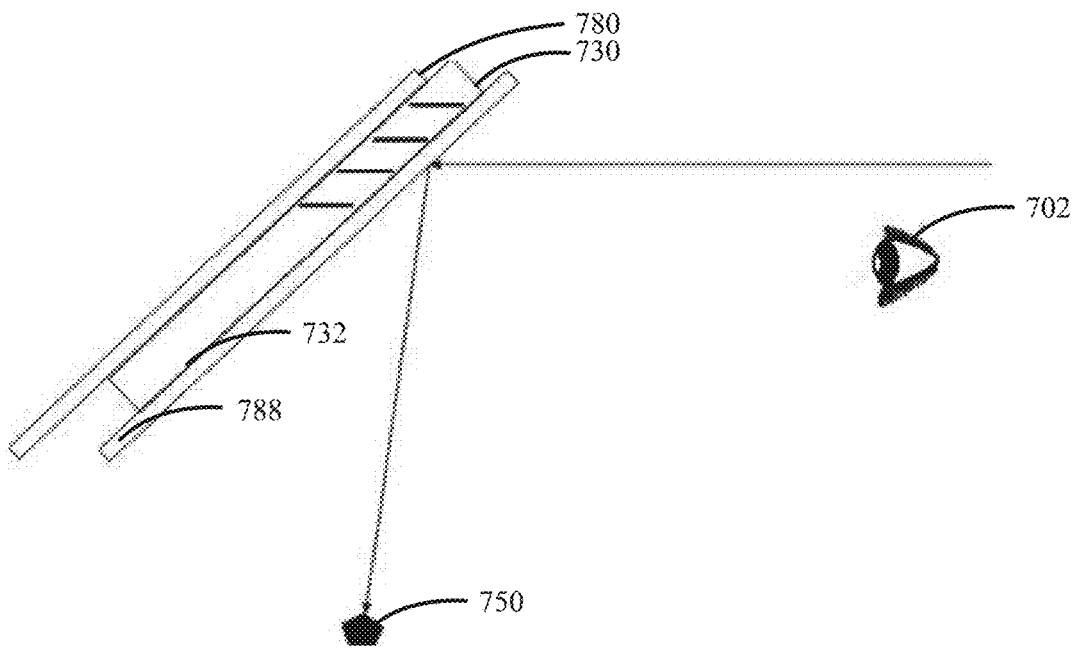

Reference is now made to FIG. 7D, which illustrates a side view of the reflection device 730 mounted adjacent the front windshield 780, in accordance with an embodiment of the present application. FIG. 7D is similar to FIG. 7C, however, FIG. 7D includes an auxiliary transparent panel 788. Once the reflection device 730 is mounted adjacent the front windshield 780, the auxiliary transparent panel 788 may mounted adjacent the reflection surface 732 of the reflection device 730. In some examples, the auxiliary transparent panel 788 may provide a protective barrier for the reflection surface 732 of the reflection device 730. In some embodiments, the auxiliary transparent panel 788 may provide a tinted layer of glass for filtering light rays transmitting through the reflection device 730. Accordingly, in FIG. 7D, the reflection device 730 is mounted between the front windshield 780 and the auxiliary transparent panel 788.

In the configuration illustrated in FIG. 7D, similar to the configurations described above, the array of louver slats may provide a continuous background when viewed from the field of view of the image capturing device. Further, in FIG. 7D, the auxiliary transparent panel 788 may also provide a reflection surface from which a reflection of a rear view of the vehicle may be redirected to the image capturing device 750.

Figure 7E:
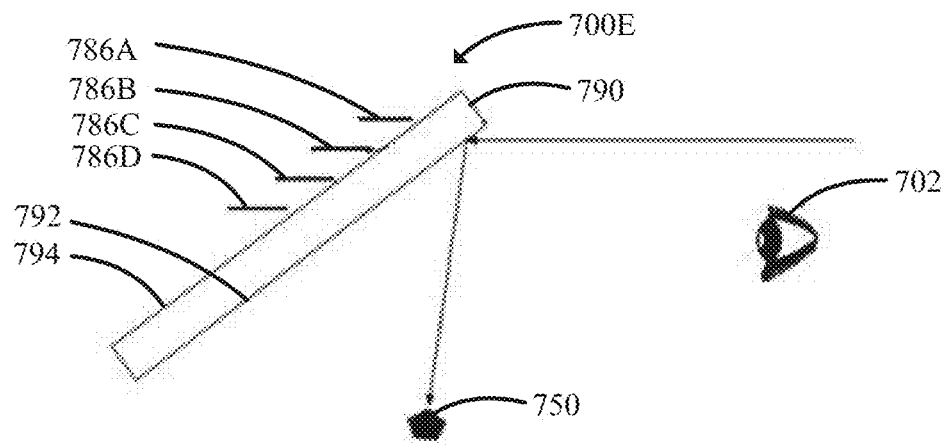
FIGS. 7E and 7F illustrate side views of reflection devices for a rear-view vision system, in accordance with an embodiment of the present application.

Reference is now made to FIG. 7E, which illustrates a side view of a reflection device 700E, in accordance with another embodiment of the present application. The reflection device 700E may include a transparent panel 790 providing a reflection surface 792 to redirect reflections of the rear view of the vehicle. The transparent panel 790 may also include a second surface 794 opposite the reflection surface 792. Further, the reflection device 700E may include an array of louver slats positioned on the second surface of the transparent panel 790. For example, the array of louver slats may include a first louver slat 786A, a second louver slat 786B, a third louver slat 786C, and a fourth louver slat 786D. When viewed from the point of view of the image capturing device 750, the array of louver slats may provide a continuous background to the reflection surface 792 in a similar way as was described with reference to FIG. 7A.

Further, similar to the embodiment described with reference to FIG. 7A, when viewed from the point of view of the vehicle operator 702, the array of louver slats may not provide a continuous background to the reflection surface 732. Rather, when viewed from the point of view of the vehicle operator 702, light rays incident on the second surface 794 may be transmitted between spaces of adjacent louver slats. Accordingly, the vehicle operator may view a front view of the vehicle.

Figure 7F:
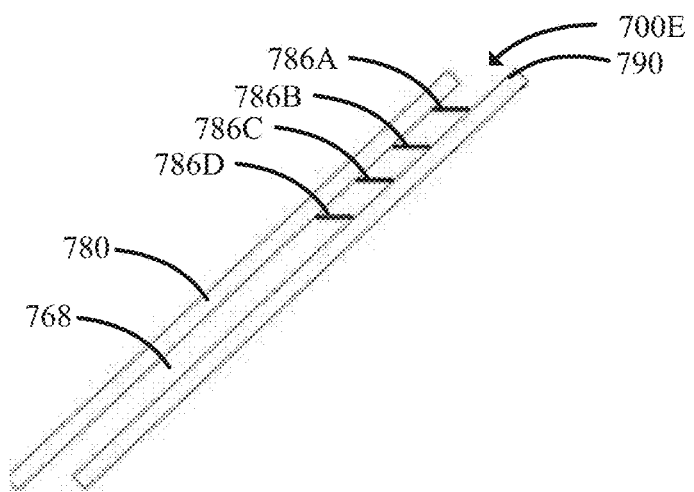

Reference is now made to FIG. 7F, which illustrates a side view of the reflection device 700E of FIG. 7E mounted on a vehicle interior facing surface of the front windshield 780, in accordance with an embodiment of the present application. In FIG. 7F, the reflection device 700E is mounted adjacent the front windshield 780. When the reflection device 700E is mounted adjacent the front windshield 780, the array of louver slats may be positioned within a gap 768 between the front windshield 780 and the transparent panel 790. That is, the reflection device 700E may be mounted on a vehicle interior surface of the front windshield 780, such that the array of louver slats may be positioned between the vehicle interior facing surface of the front windshield and the transparent panel 790.

In some embodiments, the reflection device 700E may be an after-market accessory that may be mounted to an existing front windshield 780. Although some embodiments described herein describe a reflection device as an accessory device that may be mounted adjacent a front windshield surface to redirect a reflection of a rear view of the vehicle, in some other embodiments, a transparent panel (e.g., the reflection device 730 of FIG. 7A) may be a front windshield of a vehicle, and an array of louver slats may be encapsulated in the front windshield of the vehicle for providing a continuous background to a reflection surface of the front windshield to redirect the reflection of a rear view of the vehicle. That is, in some embodiments, the array of louver slats may be "built-in" during manufacturing of a front windshield and/or the vehicle.

Figure 8A:
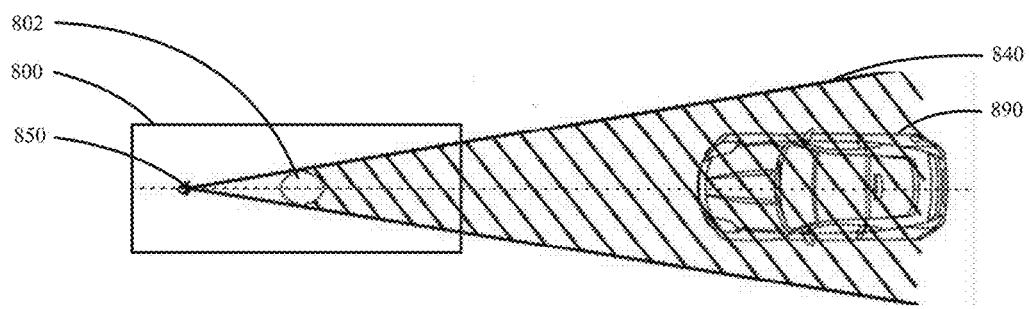
FIGS. 8A and 8B illustrate top views of vehicles for illustrating rear-view vision systems, in accordance with embodiments of the present application.

Reference is now made to FIG. 8A, which illustrates a top view of a vehicle 800 for illustrating a rear-view vision system, in accordance with an embodiment of the present application. In FIG. 8A, the vehicle 800 may have a rear area of interest (not explicitly illustrated in FIG. 8A). A second vehicle 890 may be located in the rear area of interest.

In some embodiments, a driver's seat may be positioned within the vehicle 800 for positioning a vehicle operator 802 in a vehicle front direction. However, if a vehicle operator 802 sitting in the driver's seat and impedes imaging of the rear area of interest, images generated by the image capturing device may substantially include image data depicting the vehicle operator 802. That is, images of the second vehicle 890 may not be captured because the vehicle operator is positioned to obstruct the view of the second vehicle 890. For example, the area of obstruction 840 represents portions of the rear field of view that may not be viewable by the rear-view vision system. The second vehicle 890 may be within the rear area of interest and be relevant to the vehicle operator 802.

Figure 8B:
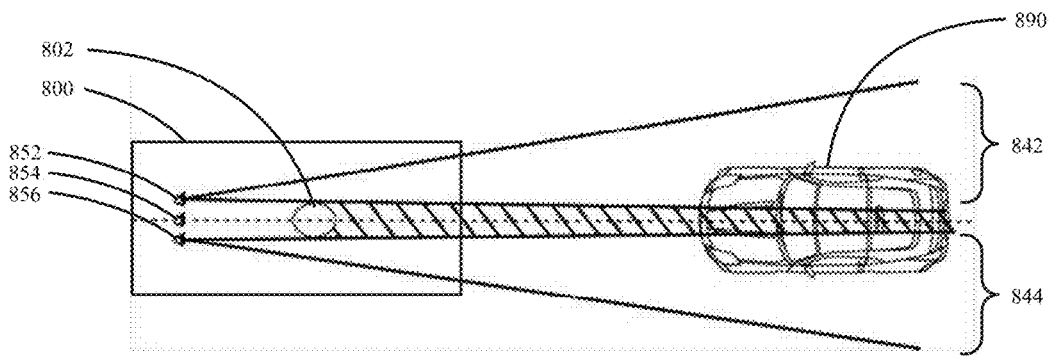

In some embodiments, it may be advantageous to include a stereoscopic imaging device for capturing rear-view images. A stereoscopic imaging device may include two cameras oriented in a common direction. Each camera in the stereoscopic imaging device may be adjacent another camera in the stereoscopic imaging device. Reference is now made to FIG. 8B, which illustrates a top view of the vehicle 800 having a rear-view vision system, in accordance with another embodiment of the present application. Similar to FIG. 8A, the vehicle 800 may have a rear area of interest (not explicitly illustrated in FIG. 8B). The second vehicle 890 may be located in the rear area of interest.

In FIG. 8B, the vehicle 800 may be configured with the rear-view vision system for providing a view that may be less obstructed, as compared to the scenario illustrated in FIG. 8A. In FIG. 8B, the rear-view vision system may include an image capturing device having two or more cameras. For example, the image capturing device may include a stereoscopic imaging device. The stereoscopic imaging device may include a first camera for generating rear-view images that may appear to have been captured at a first camera virtual position 852. The first camera may be associated with a first field of view 842.

The stereoscopic imaging device may also include a second camera for generating rear-view images that may appear to have been captured at a second camera virtual position 856. The second camera may be associated with a second field of view 844. In some embodiments, the positioning of the first camera and the second camera may be adjusted such that the first field of view 842 and the second field of view 844, respectively, may cover any other rear area of interest (e.g., a rear area of interest different than what is depicted in FIG. 8B).

In some embodiments, the stereoscopic imaging device may be configured to generate image pairs of the rear view of the vehicle. For example, an image pair may include a first image capturing a reflection of a rear view in the first field of view 842. The image pair may also include a second image capturing a reflection of a rear view in the second field of view 844. Collectively, the first image and the second image form an image pair. When the image pairs are presented as two images offset from one another (e.g., the first image may be akin to an image from a left eye and the second image may be akin to an image from a right eye), the images of the image pair may be combined to provide a view that is less obstructed than a view illustrated in FIG. 8A. For example, if an image pair were presented on a display unit, a vehicle operator's brain may combine images in the image pair to provide to the vehicle operator with the less obstructed view.

In some embodiments, the image capturing device may further include a third camera positioned between the first camera and the second camera. The third camera may be oriented in a common direction with the first camera and the second camera. The third camera may generate rear-view images that may appear to have been captured at a third camera virtual position 854. In FIG. 8B, the vehicle operator may be sitting in the driver's seat and may impede a field of view associated with the third camera virtual position 854. Accordingly, in some embodiments, a digital signal processor of the image capturing device may be configured to identify interior objects within the vehicle 800 based on image data from the third camera. The digital signal processor may also be configured to generate a template of the interior objects within the vehicle based on image data from the third camera. Further, the digital signal processor may be configured to overlay the generated template on stitched image data from the first camera and the second camera for generating a collective rear view image for display on a standard display unit.

In the example described above, because the viewpoint of the first camera and the third camera may be substantially similar or the same, there may be minimal or little distortion from resulting stitched images from the respective cameras. Accordingly, with the rear-view vision system described with reference to FIG. 8B, image data from two or more cameras may be configured for capturing a rear view of the vehicle 800, in spite of physical obstacles, such as the vehicle operator 802. Further, the rear-view vision system described with reference to FIG. 8B may stitch image data captured from two or more cameras. By stitching image data captured from two or more cameras, the rear-view vision system may be configured to provide a less obstructed view for providing a rear image of the rear area of interest.

Overall, to overcome challenges associated with the rear-view vision system having a single camera (e.g., system in FIG. 8A), a rear-view vision system may be configured with two or more cameras (e.g., system in FIG. 8B) for collectively providing a rear view within the rear area of interest of the vehicle 800. Because the image capturing device includes the first camera and the second camera, the first camera and the second camera may collectively provide a less obstructed view (e.g., as compared to the scenario in FIG. 8A), where portions of the second vehicle 890 may be depicted in a generated rear-view image.

In some embodiments, the rear-view vision system may include a display unit that is a stereoscopic display device for displaying image pairs of the rear view of the vehicle. In some embodiments, the rear-view vision system may include an optical head-mounted display for displaying image pairs of the rear-view of the vehicle. In some embodiments, the rear-view vision system may include an standard display unit for displaying stitched and/or overlaid image data of the rear-view of the vehicle.

As described herein, a vehicle operator 802 may depend on visually assessing relative size of objects or changes in size of objects over time for assessing objects that may be in the rear area of interest. The vehicle 800 may include one or more physical obstacles (see e.g., vehicle operator 802, or window pillars within the vehicle) within the rear-view vision system field of view. Although the physical obstacles may impede portions of the vehicle operator's view of the rear area of interest, the physical obstacles may, in some examples as an overlaid template, be useful to the vehicle operator as physical points of reference.

Figure 9:
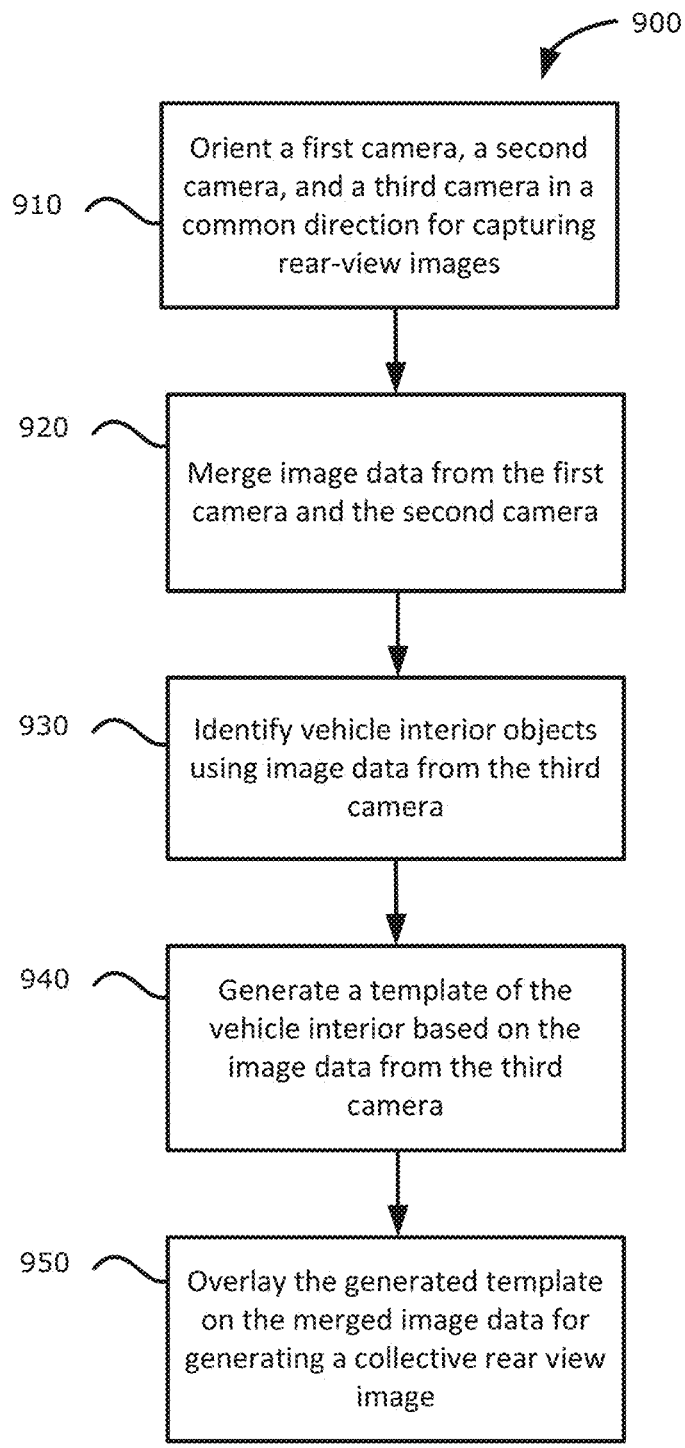
FIG. 9 is a flowchart a method of generating a template of physical points of reference for a rear-view vision system, in accordance with an embodiment of the present application.

Reference is now made to FIG. 9, which is a flowchart illustrating an example method 900 of generating a template of physical points of reference for the rear-view vision system, in accordance with an embodiment of the present application. The method 900 may be performed by the rear-view vision system of the type described in the present application, or a variation of such rear-view vision systems. For example, in some embodiments, computer-executable program instructions may configure a digital signal processor of the rear-view vision system to perform the method 900. In some embodiments, the rear-view vision system may include a first camera and a second camera to capture a reflection of the rear view of the vehicle. The first camera and the second camera may be oriented in a common direction. In some embodiments, the first camera and the second camera may be part of a stereoscopic imaging device. In some embodiments, the image capturing device may include a third camera positioned between the first camera and the second camera.

At 910, the rear-view vision system may orient a first camera, a second camera, and a third camera in a common direction. The first camera, the second camera, and the third camera may be mounted on a common mount, and the rear-view vision system may be capable of adjusting the position of each of the first camera, the second camera, and the third camera. For instance, each of the cameras may be mounted on a motorized platform. The rear-view vision system may be capable of configuring motorized platforms on which each camera may be mounted. Accordingly, the rear-view vision system may be programmed to adjust each motorized platform such that the first camera, the second camera, and the third camera are oriented in a common direction. In other embodiments, the platforms may not be motorized, but may be mounted on hinges and may be adjustable by the vehicle operator.

At 920, the rear-view vision system may capture image data using the first camera and the second camera and, subsequently, stitch together the image data from the first camera and the second camera. The image data from the first camera and the second camera may be stitched together for generating a rear-view image depicting a rear vehicle view.

At 930, the rear-view vision system may identify objects within the interior of the vehicle using image data from the third camera. In some embodiments, the third camera may be a different type of camera than the first camera and the second camera. For example, the third camera may be a single-lens reflex camera for capturing still images. The third camera may be configured for capturing image details of the interior of the vehicle, such as an image of the vehicle operator or the window supports (e.g., B-pillar, C-pillar, etc.). Because the interior of the vehicle may generally be static, the third camera may not need to be capable of capturing a video stream or may not need to be capable of capturing images at high frame rates. In contrast, the first camera and the second camera may be configured to continuously capture images for collectively providing a view that illustrates a rear area of interest.

At 940, the rear-view vision system may generate a template of the interior of the vehicle based on image data from the third camera. As described, in some embodiments, the third camera may be configured for capturing image details of the interior of the vehicle.

Details of the interior of the vehicle may generally be static. Accordingly, the rear-view vision system may generate a template of physical points of reference that may be useful to a vehicle operator for managing space around the vehicle. In some embodiments, the rear-view vision system may periodically generate an updated template of the vehicle interior. For example, the rear-view vision system may generate an updated template of the vehicle interior every time the rear-view vision system is initialized or starts up. In other examples, the rear-view vision system may generate an updated template of the vehicle interior when the system detects that the configuration of the vehicle interior may have changed. The vehicle interior may change due to a change in the number of passengers. The vehicle interior may also appear to change if the orientation of the cameras have changed (e.g., orientation change due to re-alignment/re-calibration or orientation change due to vehicle operator adjustment). Because image details of the interior of the vehicle may infrequently change, capabilities of the third camera need not be the same as capabilities of the first camera and the second camera.

At 950, the rear-view vision system may overlay the generated template of the vehicle interior on the merged image data for generating a collective rear view image for display on a standard display unit. For example, the rear-view vision system may continuously generate merged image data for allowing the vehicle operator to monitor the rear view of the vehicle. To assist the vehicle operator in utilizing the merged image data, the overlaid template of the vehicle interior may provide the physical points of reference. Accordingly, the vehicle operator may visually compare the physical points of reference and relative size of objects within the rear area of interest (e.g., other vehicles or pedestrians). The vehicle operator may also visually compare the physical points of reference and changes in size of objects over time (e.g., movement of other vehicles or pedestrians within the rear area of interest).

Overall, embodiments of the rear-view vision system may supplement current devices that assist a vehicle operator in managing the space around a vehicle. In some embodiments, the rear-view vision system may replace traditional rear-view mirrors (e.g., mounted on a front windshield) or side view mirrors (e.g., mounted near A-pillars of vehicles). Embodiments of the rear-view vision systems of the present application may provide a larger or wider field of view overlapping a rear area of interest, thereby reducing or minimizing traditional blind spots of the vehicle. Further, embodiments of the rear-view vision systems may ameliorate challenges associated with image distortion or artifacts associated with curved or convex mirrors (e.g., images appearing or seeming farther from the mirror than they actually are).

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A rear-view vision system for a vehicle, the system comprising:
   a reflection device mounted adjacent a front windshield surface to redirect a reflection of a rear view of the vehicle, wherein the reflection device includes a reflection surface to redirect the rear view of the vehicle and an array of louver slats adjacent the reflection surface, and wherein a distance between adjacent louver slats in the array of louver slats is a common distance;

an image capturing device having a field of view facing the reflection device to capture a rear-view image of the reflection; and a display unit in communication with the image capturing device for displaying the captured rear-view image to a vehicle operator, whereby a louver slat in the array of louver slats is spaced from an adjacent louver slat by the common distance such that the array of louver slats provides a continuous background to the reflection surface when viewed from the field of view of the image capture device.

2. The rear-view vision system of claim 1, wherein the reflection device extends between a left windshield side and a right windshield side.

3. The rear-view vision system of claim 1, wherein the reflection device is positioned nearer to a vehicle roof than the image capturing device.

4. The rear-view vision system of claim 1, wherein the reflection device is positioned substantially parallel to the front windshield surface.

5. The rear-view vision system of claim 1, wherein the image capturing device is positioned on a dashboard at a substantially midpoint between a left side and a right side of the vehicle.

6. The rear-view vision system of claim 1, wherein the louver is opaque or absorptive of light.

7. The rear-view vision system of claim 1, wherein the reflection device includes a transparent panel providing the reflection surface to redirect the reflection of the rear view of the vehicle, and wherein the array of louver slats is encapsulated within the transparent panel adjacent the reflection surface.

8. The rear-view vision system of claim 7, wherein the reflection device is mounted on a vehicle interior facing surface of the front windshield.

9. The rear-view vision system of claim 1, wherein the reflection device includes a transparent panel providing the reflection surface to redirect the reflection of the rear view of the vehicle, and wherein the transparent panel includes a second surface opposite the reflection surface, and wherein the array of louver slats is positioned on the second surface of the transparent panel.

10. The rear-view vision system of claim 9, wherein the reflection device is mounted on a vehicle interior facing surface of the front windshield, such that the array of louver slats is positioned between the vehicle interior facing surface of the front windshield and the transparent panel.

11. The rear-view vision system of claim 1, wherein each louver slat in the array of louver slats includes a top planar portion substantially facing up and a bottom planar portion substantially facing down, and whereby the array of louver slats are angled such that a front view of the vehicle is viewable by the vehicle operator through spaces between the louver slats.

12. The rear-view vision system of claim 1, wherein the image capturing device includes a horizontal field of view aligning with a reflection width of the reflection device extending between a left windshield side and a right windshield side.

13. The rear-view vision system of claim 1, wherein the display unit is a stereoscopic display device for displaying image pairs of the rear view of the vehicle.

14. The rear-view vision system of claim 1, wherein the display unit is an optical head-mounted display for displaying image pairs of the rear-view of the vehicle.

15. The rear-view vision system of claim 1, wherein the image capturing device is a stereoscopic imaging device for generating image pairs of the rear view of the vehicle.

16. The rear-view vision system of claim 15, wherein the image capturing device includes a digital signal processor configured to stitch a first image from a first camera of the stereoscopic imaging device to a second image from a second camera of the stereoscopic imaging device.

17. The rear-view vision system of claim 16, wherein the image capturing device further includes a third camera positioned between the first camera and the second camera, the third camera being oriented in a common direction with the first camera and the second camera, and wherein the digital signal processor is configured to:

identify interior objects within the vehicle based on image data from the third camera;

generate a template of the interior objects within the vehicle based on image data from the third camera; and overlay the generated template on stitched image data from the first camera and the second camera for generating a collective rear view image for display on a standard display unit.

18. The rear-view vision system of claim 1, wherein the image capturing device includes a rectilinear lens.

19. The rear-view vision system of claim 1, wherein the image capturing device is mounted on an adjustable platform for adjusting alignment of the field of view of the image capturing device to the reflection device.

* * * * *